United States Patent
Nguyen et al.

(10) Patent No.: US 10,040,873 B2
(45) Date of Patent: Aug. 7, 2018

(54) SULFUR-FREE, ZINC-FREE CURE SYSTEM FOR HALOBUTYL AND HALOGEN CONTAINING POLYMERS

(71) Applicant: LANXESS Butyl Pte. Ltd., Singapore (SG)

(72) Inventors: Paul Nguyen, London (CA); Gilles Arsenault, London (CA)

(73) Assignee: ARLANXEO Canada Inc., Sarnia, CA (US)

( * ) Notice: Subject to any disclaimer, the term of this patent is extended or adjusted under 35 U.S.C. 154(b) by 414 days.

(21) Appl. No.: 14/653,362

(22) PCT Filed: Dec. 19, 2013

(86) PCT No.: PCT/CA2013/001065
§ 371 (c)(1),
(2) Date: Jun. 18, 2015

(87) PCT Pub. No.: WO2014/100890
PCT Pub. Date: Jul. 3, 2014

(65) Prior Publication Data
US 2016/0108141 A1    Apr. 21, 2016

Related U.S. Application Data

(60) Provisional application No. 61/745,858, filed on Dec. 26, 2012.

(51) Int. Cl.
*C08K 5/50*    (2006.01)
*C08C 19/32*    (2006.01)

(52) U.S. Cl.
CPC ............... *C08C 19/32* (2013.01); *C08K 5/50* (2013.01)

(58) Field of Classification Search
CPC .................................. C08K 5/50; C08C 19/32
See application file for complete search history.

(56) References Cited

U.S. PATENT DOCUMENTS

| | | |
|---|---|---|
| 4,128,510 A | 12/1978 | Richwine |
| 4,288,576 A | 9/1981 | Richwine |
| 4,357,446 A | 11/1982 | Matoba |
| 2,356,128 A | 8/1984 | Thomas et al. |
| 4,591,617 A | 5/1986 | Berta |
| 6,525,128 B2 | 2/2003 | Zanzig |
| 7,446,151 B2 | 11/2008 | Resendes et al. |
| 7,662,480 B2 | 2/2010 | Resendes et al. |
| 2012/0148773 A1* | 6/2012 | Parent ................... B01J 41/14 428/36.9 |

OTHER PUBLICATIONS

Ullmanns Encyclopedia of Industrial Chemistry, vol. A 23, 1993, VCH Verlag, pp. 288-295.
Morton, Maurice, "Rubber Technology" (Third Edition), Chapter 10 (Van Nostrand Reinhold Company 1987, pp. 297-300.
Parent J. Scott, et al., "Imidazolium bromide derivatives of poly(isobutylene-co-isoprene): A new class of elastomeric ionomers", Polymer 52, 2011, Elsevier, pp. 5410-5418.
International Search Report from International Application No. PCT/CA2013/001065, dated Mar. 10, 2014, two pages.

* cited by examiner

Primary Examiner — Peter D. Mulcahy

(57) ABSTRACT

This invention discloses a sulfur free and ZnO free cross-linking composition comprising a multifunctional phosphine crosslinking agent and halobutyl polymers or halogen containing polymers.

18 Claims, 7 Drawing Sheets

SULFUR-FREE, ZINC-FREE CURE SYSTEM FOR HALOBUTYL AND HALOGEN CONTAINING POLYMERS

FIELD OF THE INVENTION

This invention relates to curable compositions for halobutyl and halogen containing polymers, comprising multifunctional phosphine as a crosslinking agent.

BACKGROUND OF THE INVENTION

Poly(isobutylene-co-isoprene) or IIR, is a synthetic elastomer commonly known as butyl rubber (or butyl polymer) which has been prepared since the 1940's through the random cationic copolymerization of isobutylene with small amounts of isoprene (usually not more than 2.5 mol %). As a result of its molecular structure, IIR possesses superior air impermeability, a high loss modulus, oxidative stability and extended fatigue resistance.

Butyl rubber is understood to be a copolymer of an isoolefin and one or more, preferably conjugated, multiolefins as comonomers. Commercial butyl comprises a major portion of isoolefin and a minor amount, usually not more than 2.5 mol %, of a conjugated multiolefin. Butyl rubber or butyl polymer is generally prepared in a slurry process using methyl chloride as a diluent and a Friedel-Crafts catalyst as part of the polymerization initiator. This process is further described in U.S. Pat. No. 2,356,128 and Ullmanns Encyclopedia of Industrial Chemistry, volume A 23, 1993, pages 288-295.

Halogenation of this butyl rubber produces reactive allylic halide functionality within the elastomer. Conventional butyl rubber halogenation processes are described in, for example, Ullmann's Encyclopedia of Industrial Chemistry (Fifth, Completely Revised Edition, Volume A231 Editors Elvers, et al.) and/or "Rubber Technology" (Third Edition) by Maurice Morton, Chapter 10 (Van Nostrand Reinhold Company (c) 1987), pp. 297-300.

The development of halogenated butyl rubber (halobutyl, or XIIR) has greatly extended the usefulness of butyl by providing much higher curing rates and enabling co-vulcanization with general purpose rubbers such as natural rubber and styrene-butadiene rubber. Butyl rubber and halobutyl rubber are high value polymers, as they possess the unique combination of properties (for example, excellent impermeability, good flex, good weatherability, co-vulcanization with high unsaturation rubbers, in the case of halobutyl). These properties allowed the development of more durable tubeless tires with the air retaining inner liner chemically bonded to the body of the tire.

In addition to tire applications, the good impermeability, weathering resistance, ozone resistance, vibration dampening, and stability of halobutyl rubbers make them good candidates for materials for pharmaceutical stoppers, construction sealants, hoses, and mechanical goods.

Like other rubbers, for most applications, halobutyl rubber must be compounded and vulcanized (chemically crosslinked) to yield useful, durable end use products. The selection and ratios of the proper fillers, processing aids, stabilizers, and curatives also play critical roles in both how the compound will process and how the end product will behave.

Elemental sulfur and organic accelerators are widely used to crosslink butyl rubber. The low level of unsaturation requires aggressive accelerators such as thiuram or thiocarbamates. The vulcanization proceeds at the isoprene site with the polysulfidic cross links attached at the allylic positions, displacing the allylic hydrogen. The number of sulfur atoms per crosslink is between one and four or more. Cure rate and cure state both increase if the diolefin content is increased resulting in higher degree of unsaturation. Sulfur cross-links have limited stability at sustained high temperature.

Resin cure systems which commonly use alkyl phenol-formaldehyde derivatives provide for carbon-carbon cross-links and more stable compounds.

In halobutyl rubber, the existence of allylic halogen allows easier cross-linking than allylic hydrogen due to the fact that halogen is a better leaving group in nucleophilic substitution reactions. Furthermore, bromobutyl is faster curing than chlorobutyl and has better adhesion to high unsaturation rubbers.

Existing prior art systems for the cure of bromobutyl and bromine containing polymers generally use sulfur and zinc derivatives as curing agent.

For example, to improve the physical characteristics of tire liner compositions comprised of blends of halobutyl rubber and epihalohydrin rubber, it was disclosed in U.S. Pat. No. 4,591,617 to crosslink the tire liner compositions with a crosslinking composition containing both (1) a sulfur curative system, which cures through the unsaturation present in the halobutyl rubber or mixtures thereof with butyl rubber, and (2) a nonsulfur curative system, which cures through the halogen functionality of the epihalohydrin rubber in the blend. The sulfur curative system disclosed comprises (a) sulfur, (b) a conventional sulfur accelerator, such as mercaptobenzothiazole and its derivatives, sulfenamides, thiurams, and dithiocarbamate salts, and (c) a zinc oxide promotor. The nonsulfur curative system disclosed comprises di- and tri-functional mercapto compounds and their derivatives, such as 2,5-dimercapto-1,3,4-thiadiazole or trithiocyanuric acid, alone or in combination with a basic activator as set forth in U.S. Pat. Nos. 4,128,510 and 4,288,576.

The basic activator materials that are disclosed in U.S. Pat. Nos. 4,128,510 and 4,288,576 include basic amines and amine salts, and basic metal oxides and hydroxides and their salts with weak acids, such as, for example, lead oxides, zinc oxide, magnesium oxide, calcium oxide, calcium hydroxide, barium oxide, zinc carbonate, barium carbonate, sodium carbonate, lead acetate and sodium acetate. These basic materials are disclosed as being suitable for use in combination with certain 2,5-dimercapto-1,3,4-thiadiazoles as a crosslinking system for halogen-containing polymers, including epihalohydrin homopolymers and copolymers, chlorobutyl rubber and bromobutyl rubber.

Another cure system for crosslinking halogen-containing rubbers is disclosed in U.S. Pat. No. 4,357,446 and comprises (1) 2,3-dimercapto-pyrazine or quinoxaline compound as a crosslinking agent, and (2) a compound of a metal of Group II or IV as an acid acceptor. The acid acceptors disclosed include oxides, hydroxides, carbonates, carboxylates silicates, borates and phosphites of Group II or IV metals; and oxides, basic carbonates, basic carboxylates, basic phosphites, basic sulfites, and tribasic sulfates of Group IVa metals.

The existing prior art cure systems for bromobutyl and bromine containing polymers typically contain sulfur and zinc oxides, which are "dirty", i.e., with high extractable levels of sulfur and zinc oxides, and are unsuitable, or unacceptable for various pharmaceutical applications.

Therefore, there remains a need for a clean cure system free of sulphur and zinc oxide for bromobutyl and bromine containing polymers.

The present invention addresses the afore-mentioned problem by providing a new class of sulfur free and zinc oxide free cure system which is based on bisphosphine derivatives for curing bromobutyl and bromine containing polymers. These new and novel crosslinkers contain multi-functional phosphine groups which react readily with the allylic bromide group on the polymers via nucleophilic substitution to form an extensive covalent crosslinking network with ionomer formation.

The approach disclosed in the present invention attempts to solve the existing problems associated with sulphur, zinc oxide and other agents for the curing of bromobutyl and bromine containing polymers. This is of much interest to the industry since the cure system of the invention herein is clean and has a minimum of chemicals added to the rubber matrix to obtain a cure.

There have been some recent efforts in exploring cure systems for halobutyl which are free of sulfur and zinc oxide. For example, in a journal article by Parent et al. in *Polymer* 2011, 52(24), 5410-5418, it describes a new class of elastomeric ionomers involving the use of dialkylated imidazoles as cross-linkers for bromobutyl rubber.

The journal article also provided only one example of the use of a bisphosphine agent, namely 1,2-bis(diphenylphosphino)ethane (DIPHOS) to cross-link bromobutyl rubber. The authors compared the cure behaviour of DIPHOS to the bis-imidazole and commented that the DIPHOS agent was too reactive at 100° C. However, the article did not provide any results of a sufficient induction period at 160° C. No other bisphosphine agents besides DIPHOS were mentioned in this article. The article also fails to recognize the novel aspect of the bisphosphine agent in which the length of the alkyl spacer between the phosphine moieties plays a crucial role in the curing chemistry of bromobutyl rubber.

The present invention discloses however, that DIPHOS, as shown in the prior art, is not representative of the chemistry for this class of crosslinking agent. Instead, the better choice of the bisphosphine agent to achieve optimum cross-linking density is where the alkyl spacer is consisted of three methylene chain or longer.

The cure behaviour and cure properties can be further optimized through the judicious choice of the bisphosphine agent. Replacing the alkyl spacer with an aromatic spacer between the phosphine groups can alter the cure rate and the state of cure.

The present invention offers a method to cure halobutyl rubber with only adding one component (bisphosphine) during the mixing process, followed by heating to obtain the crosslinking.

The chemistry disclosed in the present invention additionally offers the potential for low leachable cured butyl polymers. It provides an advantage in that it does not require the use of peroxides. As a bisphosphine, even if one end gets oxidized, the other end statistically has a good chance of attaching to the elastomer through formation of the ionomer. This will greatly reduce any leachables of the bisphosphine component from the cross-linked polymer network.

Therefore, the present invention offers a more suitable choice of bisphosphine agents as a new class of sulfur free and zinc oxide free cure system for curing halobutyl polymers.

SUMMARY OF THE INVENTION

This invention discloses a sulfur free and ZnO free cross-linking composition for crosslinking a blend of a polymer selected from the group consisting of halobutyl polymers and halogen containing polymers, wherein the halogen is preferably bromine and chlorine, and a cross-linking agent based on a bisphosphine agent, the bisphosphine agent is preferably bisphosphine alkyl wherein n of the alkyl group is ≥3.

The cross-linking composition obtained thereof (i.e. new cure system) shows significant improvement in compression set properties than the conventional resin cure formulation for bromobutyl.

According to one aspect of the invention, it is disclosed a sulfur free and ZnO free composition comprising:
(a) a polymer selected from the group consisting of halobutyl polymers and halogen containing polymers, and
(b) a multifunctional phosphine crosslinking agent.

According to a further aspect of the invention, it is disclosed a process for preparing a cross-linking composition comprising the steps of:
(a) providing a polymer selected from the group consisting of halobutyl polymers and halogen containing polymers;
(b) providing a multifunctional phosphine crosslinking agent; and
(c) reacting the polymer in (a) with the cross linking reagent in (b).

BRIEF DESCRIPTION OF THE DRAWINGS

The invention will now be described by way of reference to the drawings, in which.

DETAILED DESCRIPTION OF THE INVENTION

Halobutyl Polymer

Figure 1:
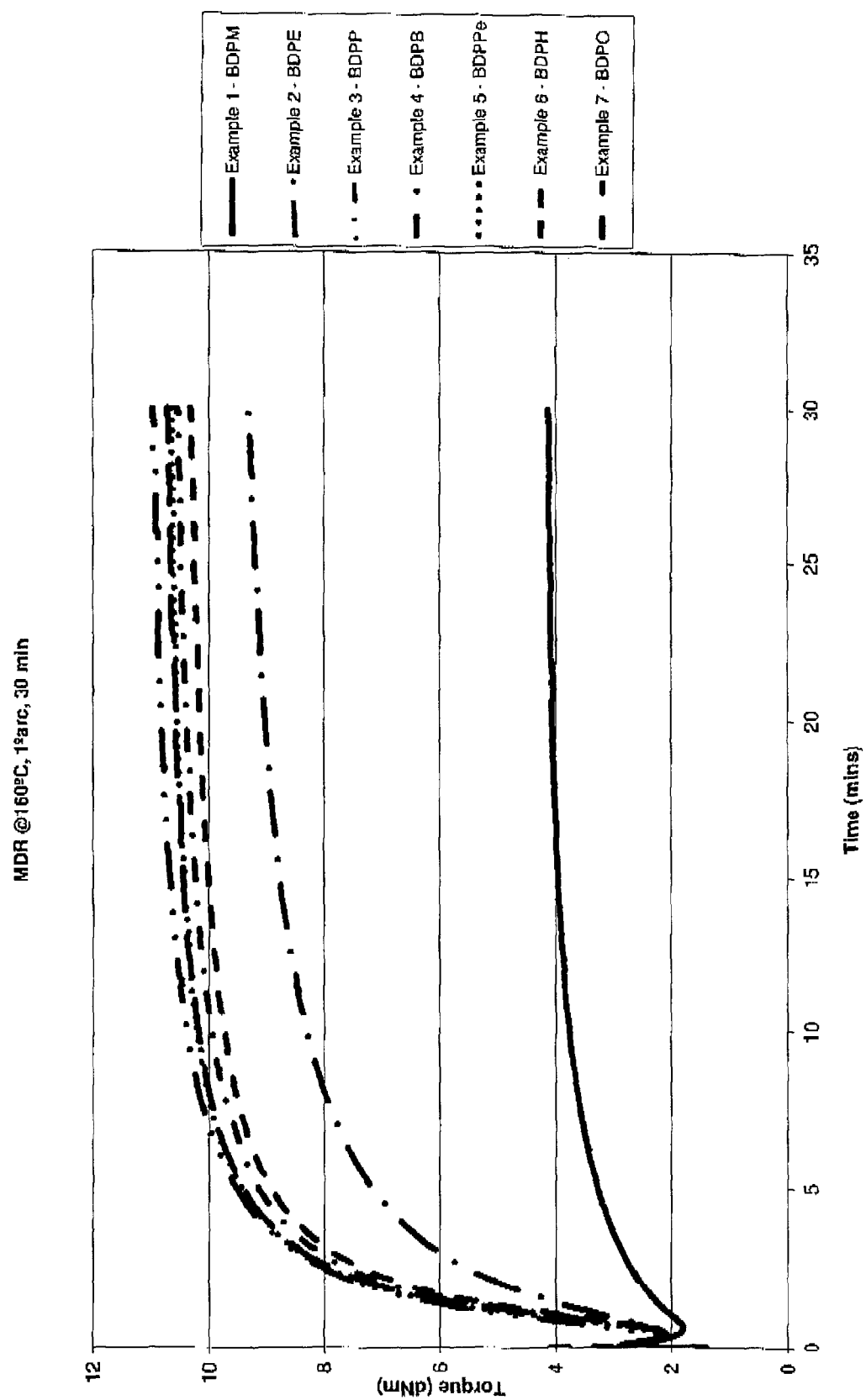
FIG. 1 shows the effects of the alkyl spacer on bisphosphine nucleophiles on the cure behavior of bromobutyl rubber.

The halobutyl polymers used in the present invention are copolymers of at least one isoolefin monomer and one or more multiolefin monomers or one or more alkyl substituted aromatic vinyl monomers or both.

In one embodiment, the halobutyl polymers used in the formation of the ionomer of the present invention comprises at least one allylic halo moiety, or at least one halo alkyl moiety or both.

In one embodiment, the halobutyl polymers comprises repeating units derived from at least one isoolefin monomer and repeating units derived from one or more multiolefin monomers. In such an embodiment, one or more of the repeating units derived from the multiolefin monomers comprise an allylic halo moiety.

In one embodiment, the halobutyl polymers is obtained by first preparing a copolymer from a monomer mixture comprising one or more isoolefins and one or more multiolefins (also referred to as multiolefin butyl rubber polymer), followed by subjecting the resulting copolymer to a halogenation process to form the halobutyl polymers. Halogenation can be performed according to the process known by those skilled in the art, for example, the procedures described in Rubber Technology, 3rd Ed., Edited by Maurice Morton, Kluwer Academic Publishers, pp. 297-300 and further documents cited therein.

During halogenation, some or all of the multiolefin content of the copolymer is converted to units comprising allylic halides. The total allylic halide content of the halobutyl polymers cannot exceed the starting multiolefin content of the parent copolymer.

In one embodiment, the monomer mixture used in preparing the multiolefin butyl rubber comprises from about 80% to about 99.5% by weight of at least one isoolefin monomer and from about 0.5% to about 20% by weight of at least one multiolefin monomer. In one embodiment, the monomer mixture comprises from about 83% to about 98% by weight of at least one isoolefin monomer and from about 2.0% to about 17% by weight of a multiolefin monomer.

In one embodiment, the multiolefin butyl polymer comprises at least 0.5 mol % repeating units derived from the multiolefin monomers. In one embodiment, the repeating units derived from the multiolefin monomers are at least 0.75 mol %. In one embodiment, the repeating units derived from the multiolefin monomers are at least 1.0 mol %. In one embodiment, the repeating units derived from the multiolefin monomers are at least 1.5 mol %. In one embodiment, the repeating units derived from the multiolefin monomers are at least 2.0 mol %. In one embodiment, the repeating units derived from the multiolefin monomers are at least 2.5 mol %.

In one embodiment, the multiolefin butyl polymer comprises at least 3.0 mol % repeating units derived from the multiolefin monomers. In one embodiment, the repeating units derived from the multiolefin monomers are at least 4.0 mol %. In one embodiment, the repeating units derived from the multiolefin monomers are at least 5.0 mol %. In one embodiment, the repeating units derived from the multiolefin monomers are at least 6.0 mol %. In one embodiment, the repeating units derived from the multiolefin monomers at least 7.0 mol %.

In one embodiment, the repeating units derived from the multiolefin monomers are from about 0.5 mol % to about 20 mol %. In one embodiment, the repeating units derived from the multiolefin monomers are from about 0.5 mol % to about 8 mol %. In one embodiment, the repeating units derived from the multiolefin monomers are from about 0.5 mol % to about 4 mol %. In one embodiment, the repeating units derived from the multiolefin monomers are from about 0.5 mol % to about 2.5 mol %.

In one embodiment, the halobutyl polymers for use in the present invention includes a brominated butyl rubber formed from isobutylene and less than 2.2 mol % isoprene, which is commercially available from LANXESS Deutschland GmbH and sold under the names Bromobutyl 2030™, Bromobutyl 2040™, Bromobutyl X2™, and Bromobutyl 2230™.

In one embodiment, the halobutyl polymers for use in the present invention includes a high isoprene brominated butyl rubber formed from isobutylene and at least 3 mol % isoprene or at least 4% mol % isoprene, as described in Canadian Patent Application No. 2,578,583 and 2,418,884, respectively.

In one embodiment, the halobutyl polymers of the present invention comprise copolymers of at least one isoolefin and one or more alkyl substituted aromatic vinyl monomers. In such an embodiment, one or more of the repeating units derived from the aromatic vinyl monomers comprise a halo alkyl moiety.

In one embodiment, these type of halobutyl polymers are obtained by first preparing a copolymer from a monomer mixture comprising one or more isoolefins and one or more alkyl substituted aromatic vinyl monomers, followed by subjecting the resulting copolymer to a halogenation process to form the halobutyl polymers. During halogenation, some or all of the alkyl groups of the repeating units derived from the aromatic vinyl monomers are halogenated.

In one embodiment, the halobutyl polymers of the present invention comprise copolymers of at least one isoolefin, one or more multiolefin monomers, and one or more alkyl substituted aromatic vinyl monomers. In such an embodiment, one or more units derived from the multiolefin monomers comprise an allylic halo moiety and/or one or more units derived from the substituted aromatic vinyl monomers comprise a haloalkyl moiety.

In one embodiment, the monomer mixture used in preparing the copolymer of isoolefin, the multiolefin and the alkyl substituted aromatic vinyl monomers comprise from about 80% to about 99% by weight of isoolefin monomers, from about 0.5% to about 5% by weight the multiolefin monomers, and from about 0.5% to about 15% by weight of the alkyl substituted aromatic vinyl monomers. In one embodiment, the monomer mixture comprises from about 85% to about 99% by weight of isoolefin monomer, from about 0.5% to about 5% by weight the multiolefin monomer and from about 0.5% to about 10% by weight alkyl substituted aromatic vinyl monomer.

The halobutyl polymers should have allylic bromide content from 0.05 to 2.0 mol %, more preferably from 0.2 to 1.0 mol % and even more preferably from 0.5 to 0.8 mol %. The high multiolefin halobutyl polymers should also contain residual multiolefin levels ranging from 2 to 10 mol %, more preferably from 3 to 8 mol % and even more preferably from 4 to 7.5 mol %.

Halogen Containing Polymers

Halogen containing polymers that may be used to demonstrate the scope of the invention are bromobutyl, chlorobutyl, brominated high isoprene butyl rubber, brominated isobutylene para-methylstyrene (BIMSM), brominated isoprene isobutylene p-methylstyrene terpolymer, starbranch brominated butyl (SBB) and chlorobutyl.

Formation of Bisphosphine Cross-Linking Butyl Ionomer Network

Shown in Scheme 1 below is an illustrative example, where bromobutyl rubber is reacted with alkyl bisphosphine at about 160° C. to provide bisphosphine crosslinked butyl ionomer.

Scheme 1

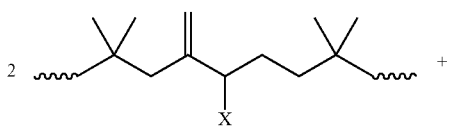

X = Br (bromobutyl)
  = Cl (chlorobuty)

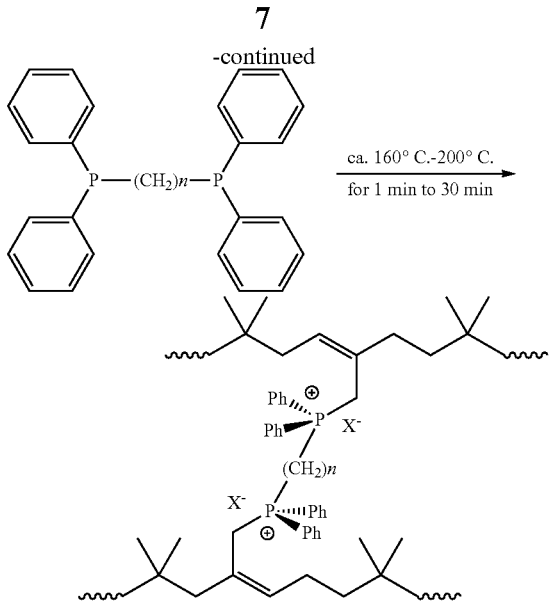

The reaction provides the simultaneous formation of bisphosphine cross-linking butyl ionomer. As a person skilled in the part would readily appreciate that the bisphosphine agents as shown may be of different alkyl lengths, as well as similar bisphosphine nucleophiles containing aromatics, heteroaromatics, cycloalkanes, heteroalkanes and heterocycloalkanes or combination thereof in between the two phosphine moieties or as the phosphine side groups can also be use, reacting with halobutyl or halogen containing polymers to form other types of ionomers.

Nucleophiles

According to the present invention, the halobutyl or bromine containing polymers can be reacted with the bisphosphine nucleophiles, i.e., symmetrical or unsymmetrical bisphosphine compounds with the structure:

$(R_2)_2P—R_1—P(R_3)_2$ wherein

R1=alkyl, alkenyl, cycloalkyl, aryl, heteroaryl, heteroalkyl, heteroalkenyl, heterocycloalkyl;

R2=R3=alkyl, alkenyl, cycloalkyl, aryl, heteroaryl, heteroalkyl, heteroalkenyl, heterocycloalkyl;

R2≠R3=alkyl, alkenyl, cycloalkyl, aryl, heteroaryl, heteroalkyl, heteroalkenyl, heterocycloalkyl.

Preferably, the bisphosphine nucleophiles are according to the following formula:

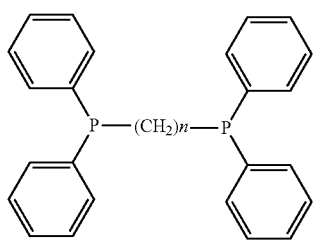

wherein n is from 1 to 8.
- n=1: bis(diphenylphosphino)methane (BDPM)
- n=2: bis(diphenylphosphino)ethane (BDPE or DIPHOS)
- n=3: bis(diphenylphosphino)propane (BDPP)
- n=4: bis(diphenylphosphino)butane (BDPB)
- n=5: bis(diphenylphosphino)pentane (BDPPe)
- n=6: bis(diphenylphosphino)hexane (BDPH)
- n=8: bis(diphenylphosphino)octane (BDPO)

According to one embodiment of the invention, the amount of allylic halide to phosphine is in the range from 15:0.01 molar ratio, more preferable 7:1 molar ratio, more preferable 4:1 molar ratio and even more preferably of about 2:1 molar ratio.

According to another embodiment of the invention, the amount of phosphine to allylic halide is in the range from 15:0.01 molar ratio, more preferable 7:1 molar ratio, more preferable 4:1 molar ratio and even more preferably of about 0.5:1 molar ratio.

The high multiolefin halobutyl polymer and the nucleophile react for about 10 to 90 minutes, preferably from 15 to 60 minutes and more preferably about 10 minutes at temperatures ranging from 140 to 200° C., preferably about 160° C.

Experiments and Results

General

Reactions of bisphosphine nucleophiles with various alkyl spacers and bromobutyl BB2030 as well as with other bromine containing polymers listed in Table 1 were conducted on a lab-scale.

The products were then subjected to compounding and Moving Die Rheometer (MDR) measurements to verify their curability.

Materials

Various halobutyl and halogen containing polymers used in the reactions are outlined in Table 1 below.

TABLE 1

| Polymer | |
|---|---|
| BB2030 | Bromobutyl 2030 is a halogenated butyl rubber polymer having 0.8-1.5 mol % unsaturation, with about 0.9 mol % allylic bromide and a product of LANXESS Corp. |
| CB1240 | Chlorobutyl 1240, is a halogenated butyl rubber polymer having 2.2 mol % unsaturation, with about 1.6 mol % allylic chloride and a product of LANXESS Corp. |
| bromobutyl (4 mol % isoprene) | regular butyl with 4 mol % unsaturation and brominated to 0.8 mol % allylic bromide Brominated isoprene isobutylene p-methylstyrene terpolymer |
| Brominated Terpolymer | A copolymer of 90.4% isobutylene, 8.2% paramethylstyrene and 1.4% isoprene; brominated to 0.83 mol % of allylic bromide |
| BIMSM | A brominated copolymer of isobutylene paramethylstyrene commercially available from ExxoMobil Chemical (ExxproTM 3035) |

Bisphosphine nucleophiles with various alkyl spacers (Table 2) were reacted with unfilled BB2030.

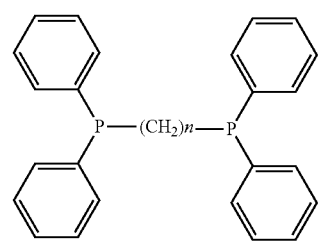

TABLE 2

| Nucleo-philes | BDPM | BDPE (DIPHOS) | BDPP | BDPB | BDPPe | BDPH | BDPO |
|---|---|---|---|---|---|---|---|
| n | 1 | 2 | 3 | 4 | 5 | 6 | 8 |

Additionally, bis(2-diphenylphosphinophenyl)ether ("DPEphos") was used as a nucleophile in the studies.

Crosslinking Reaction
Unfilled Compound

All mixes (Examples 1-17) were performed similarly in a miniaturized internal mixer. The start temperature was approximately at 30° C. and the rotor speed was about 60 rpm. Polymer was put into the mixer at time=0 minute. The bisphosphine nucleophiles were then added to the mixer at time=1 minute; no other curatives were added. Sweeping was at time=3 minutes and dumping at time=6 minutes. The final step of the mixing procedure involved refining the compounds produced from the mixer on the 4×6 mill, performing about 6 endwise passes.

Filled Compound

The mixes (Examples 18-21) were performed similarly as above except that the fillers (white or black) were added along with the bisphosphine agent. For Example 21, the mixing was performed differently where half of the polymer was added at time=0 minute, the other half of the polymer along with the bisphosphine nucleophile, the process aid and the calcined clay were added at time=0.5 minutes. Sweeping was at time=3 minutes and dumped at time=6 minutes.

Cure characteristics of all compounds were determined with the use of a Moving Die Rheometer (MDR) according to ASTM 5289. Stress-strain measurements were recorded at 23° C. and done according to ASTM 412 Method A. Hardness (Shore A2) values were determined using an A-scale durometer as described in ASTM 2240.

Additional tests include compression set and permeability. The vulcanizates were cured at 160° C. (t90+10 minutes). The initial compression value was recorded the day after curing then aged in the oven at 70° C. for 72 hours. The final compression value was recorded 30 minutes after taking the sample out of the oven. The oxygen permeability tested on the Mocon overnight, 10 hrs conditioning time at 40° C. conditioning temperature and test temperature.

Effects of the Alkyl Spacer of the Bisphosphine Nucleophiles

Reactions of bisphosphine nucleophiles with various alkyl spacers (in Table 3) and unfilled bromobutyl BB2030 (allylic bromide to bisphosphine at molar ratio of 2:1) were carried out.

TABLE 3

| Ingredient (phr) | Example 1 | Example 2 | Example 3 | Example 4 | Example 5 | Example 6 | Example 7 | Example 8 |
|---|---|---|---|---|---|---|---|---|
| BB2030 | 100 | 100 | 100 | 100 | 100 | 100 | 100 | 100 |
| BDPM | 3.0 | | | | | | | |
| BDPE (DIPHOS) | | 3.1 | | | | | | |
| BDPP | | | 3.3 | | | | | |
| BDPB | | | | 3.4 | | | | |
| BDPPe | | | | | 3.5 | | | |
| BDPH | | | | | | 3.6 | | |
| BDPO | | | | | | | 3.8 | |
| DPEphos | | | | | | | | 4.3 |
| Allylic Br: Bisphosphine Molar Ratio | 2:1 | 2:1 | 2:1 | 2:1 | 2:1 | 2:1 | 2:1 | 2:1 |

Figure 2:
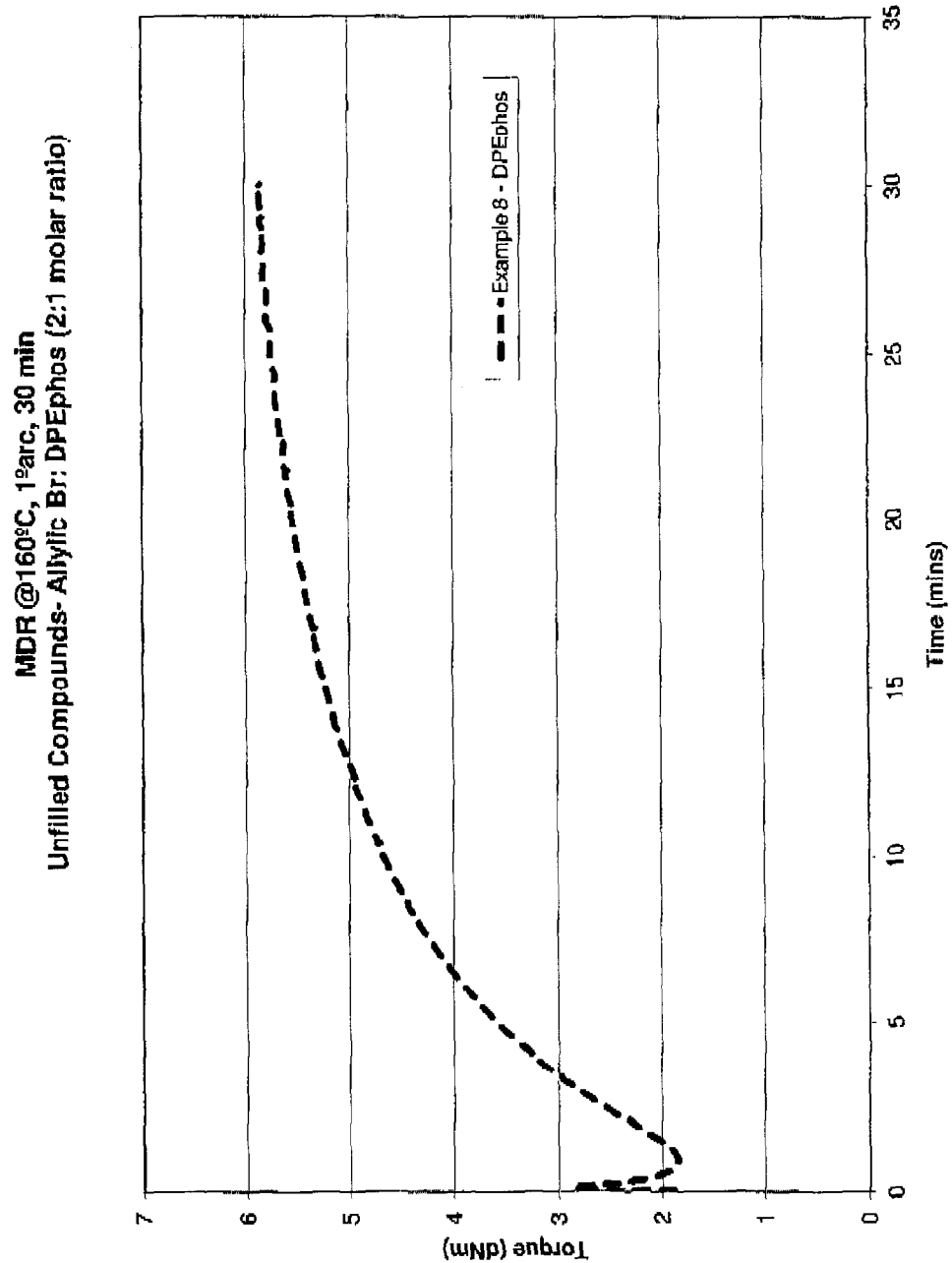
FIG. 2 shows the cure behavior of bromobutyl and Bis(2-diphenylphosphinophenyl)ether (DPEphos)

The effects of the alkyl spacer on the bisphosphine nucleophiles on the cure behavior of BB2030 are studied and the results are summarized in Table 4 and FIGS. 1 and 2.

TABLE 4

| Example # | Nucleophile | MH (dN · M) | ML (dN · M) | MH − ML (dN · M) |
|---|---|---|---|---|
| 1 | BDPM | 4.14 | 1.79 | 2.35 |
| 2 | BDPE (DIPHOS) | 9.31 | 2.10 | 7.21 |
| 3 | BDPP | 10.97 | 2.28 | 8.69 |
| 4 | BDPB | 10.55 | 2.12 | 8.43 |
| 5 | BDPPe | 10.65 | 2.09 | 8.56 |
| 6 | BDPH | 10.72 | 2.09 | 8.63 |
| 7 | BDPO | 10.32 | 2.04 | 8.28 |
| 8 | DPEphos | 5.87 | 1.85 | 4.02 |

The minimum torque (ML), maximum torque (MH) and torque difference (MH-ML) is considered as the parameters to demonstrate the degree of chemical cross-linking. The increase in its value is due to the increasing crosslink density.

The results show that alkyl spacer of n≥3 is required on the bisphosphine nucleophiles for maximum crosslinking.

Effects of the Level of Bisphosphine

Reactions of bisphosphine nucleophile BDPB with unfilled bromobutyl BB2030 with allylic bromide to bisphosphine at various molar ratios were carried out (shown in Table 5).

TABLE 5

| Ingredient (phr) | Example 9 | Example 10 | Example 4 | Example 11 | Example 12 |
|---|---|---|---|---|---|
| BB2030 | 100 | 100 | 100 | 100 | 100 |
| BDPB | 0.5 | 2 | 3.4 | 5 | 6.8 |
| Allylic Br:Bisphosphine Molar Ratio | 13.7:1 | 3.4:1 | 2:1 | 1.4:1 | 1:1 |

Figure 3:
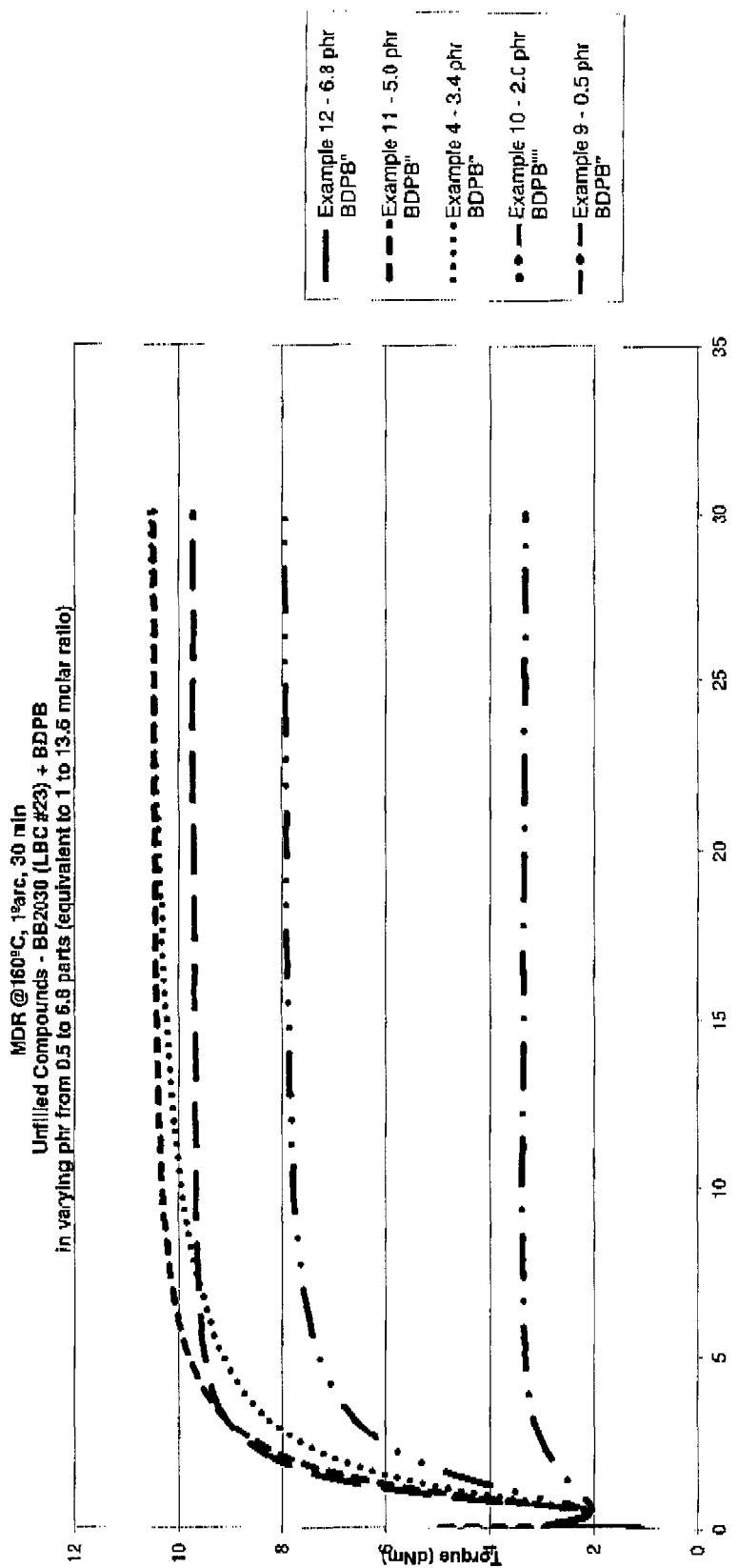
FIG. 3 shows the effects of the level of bisphosphine on the cure behavior of bromobutyl rubber.

The results and effects of the level of bisphosphine on the cure behavior of bromobutyl BB2030 are summarized in Table 6 and shown in FIG. 3.

TABLE 6

| Example # | bromide to bisphosphine molar ratio | MH (dN · M) | ML (dN · M) | MH − ML (dN · M) |
|---|---|---|---|---|
| 9 | 13.7:1 | 3.39 | 2.03 | 1.36 |
| 10 | 3.4:1 | 7.96 | 2.12 | 5.84 |

TABLE 6-continued

| Example # | bromide to bisphosphine molar ratio | MH (dN · M) | ML (dN · M) | MH − ML (dN · M) |
|---|---|---|---|---|
| 4 | 2:1 | 10.55 | 2.12 | 8.43 |
| 11 | 1.4:1 | 10.50 | 2.10 | 8.4 |
| 12 | 1:1 | 9.74 | 2.09 | 7.65 |

The results show that the optimal level of crosslinking density was achieved at ca. 3.4 phr of BDPB (equivalent to 2:1 molar ratio of allylic bromide to phosphine).

Bisphosphine Cross-linking Applied to Other Halogen Containing Polymers

Reactions of bisphosphine nucleophile BDPB with unfilled bromobutyl BB2030 and various other bromine containing polymers with allylic bromide to bisphosphine at 2:1 molar ratio were carried out (shown in Table 7).

TABLE 7

| Ingredient (phr) | Example 13 | Example 14 | Example 16 | Example 17 |
|---|---|---|---|---|
| bromobutyl (4 mol % isoprene) | 100 | | | |
| Brominated Terpolymer | | 100 | | |
| BIMSM | | | 100 | |
| CB1240 | | | | 100 |
| BDPB | 2.8 | 2.9 | 2.9 | 3.4 |
| Allylic halide:Bisphosphine Molar Ratio | 2:1 | 2:1 | 2:1 | 3.3:1 |

Figure 4:
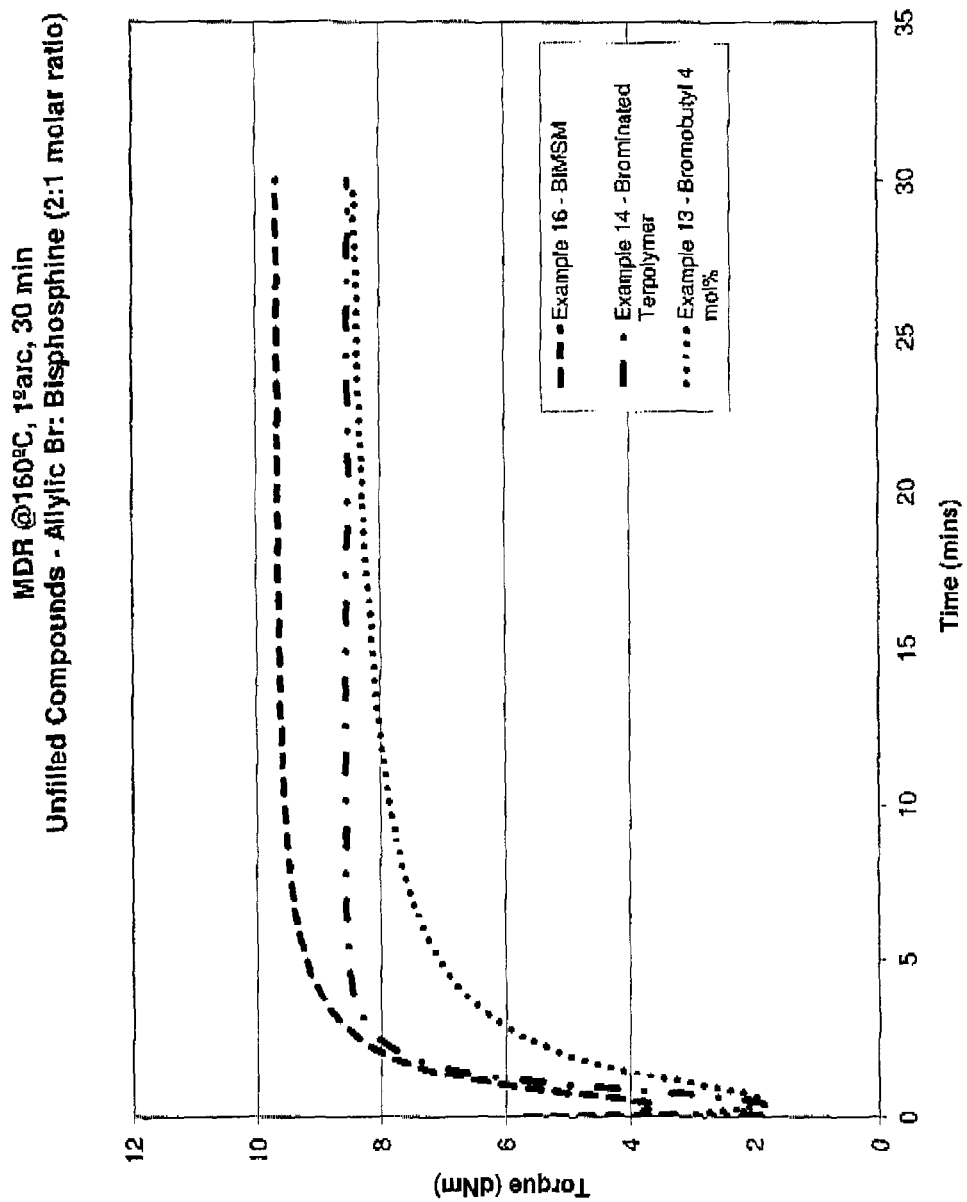
FIG. 4 shows the cure behavior for various bromine containing polymers.
Figure 5:
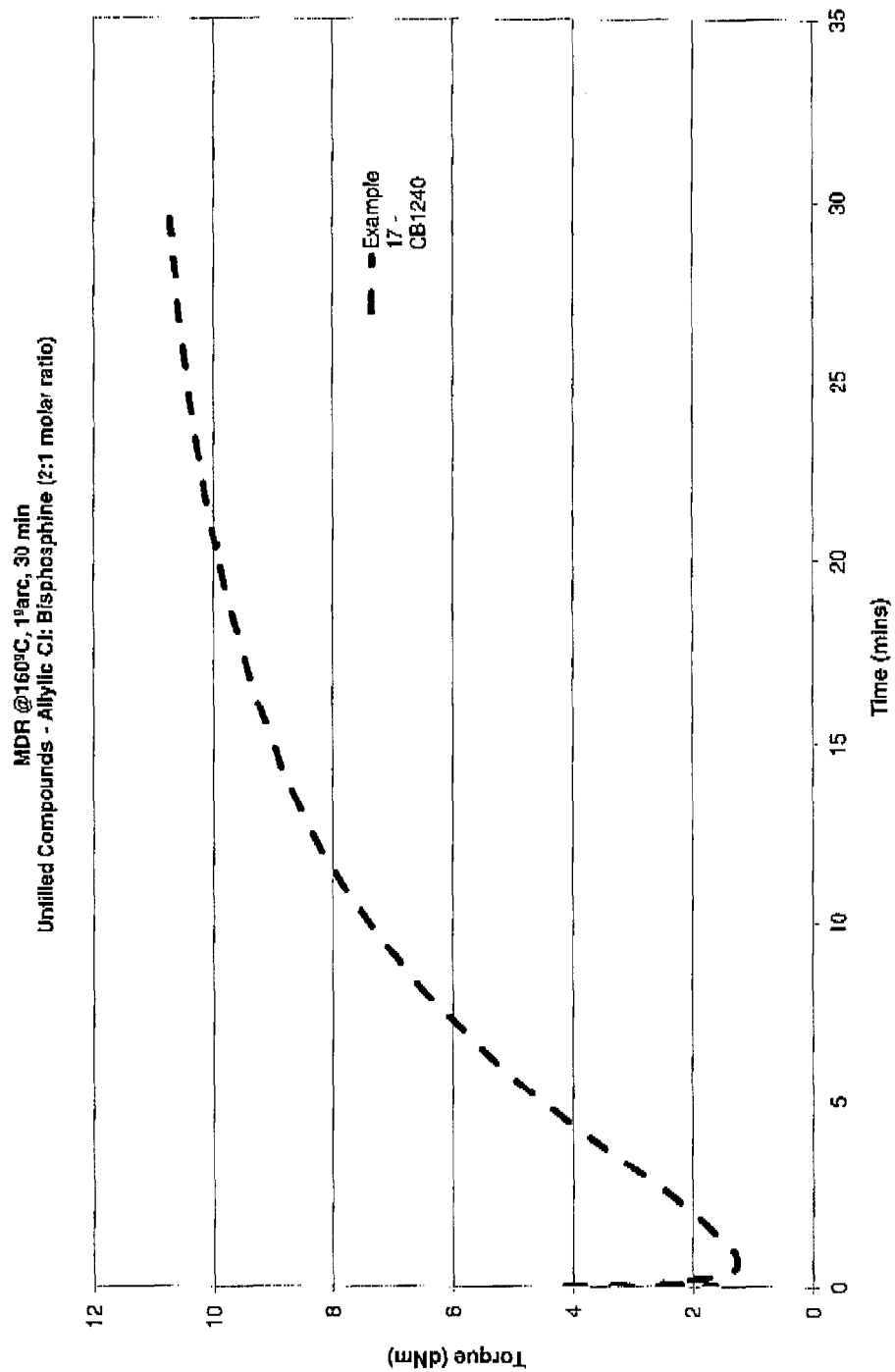
FIG. 5 shows the cure behavior for chlorobutyl rubber.

The curing effects of the products are studied and the results summarized in Table 8 below and FIGS. 4 and 5.

TABLE 8

| Example # | Compound | MH (dN · M) | ML (dN · M) | MH − ML (dN · M) |
|---|---|---|---|---|
| Example 13 | bromobutyl (4 mol % isoprene) + BDPB | 8.41 | 1.84 | 6.57 |
| Example 14 | Brominated Terpolymer + BDPB | 8.56 | 1.80 | 6.76 |
| Example 16 | BIMSM + BDPB | 9.67 | 3.43 | 6.24 |
| Example 17 | CB1240 + BDPB | 10.76 | 1.25 | 9.51 |

The results show that reactions with various bromine containing polymers using bisphosphine crosslinking agent is feasible and bromobutyl BB2030 achieved the best cross-link density.

Effects of Fillers

Reactions of bisphosphine nucleophile BDPB with bromobutyl BB2030 with various fillers (Carbon Black, White Filler) were carried out (shown in Table 9).

TABLE 9

| Ingredient (phr) | Example 18 | Example 19 |
|---|---|---|
| BB2030 | 100 | 100 |
| Carbon Black | 40 | |
| White Filler | | 40 |
| BDPB | 3.4 | 3.4 |

Figure 6:
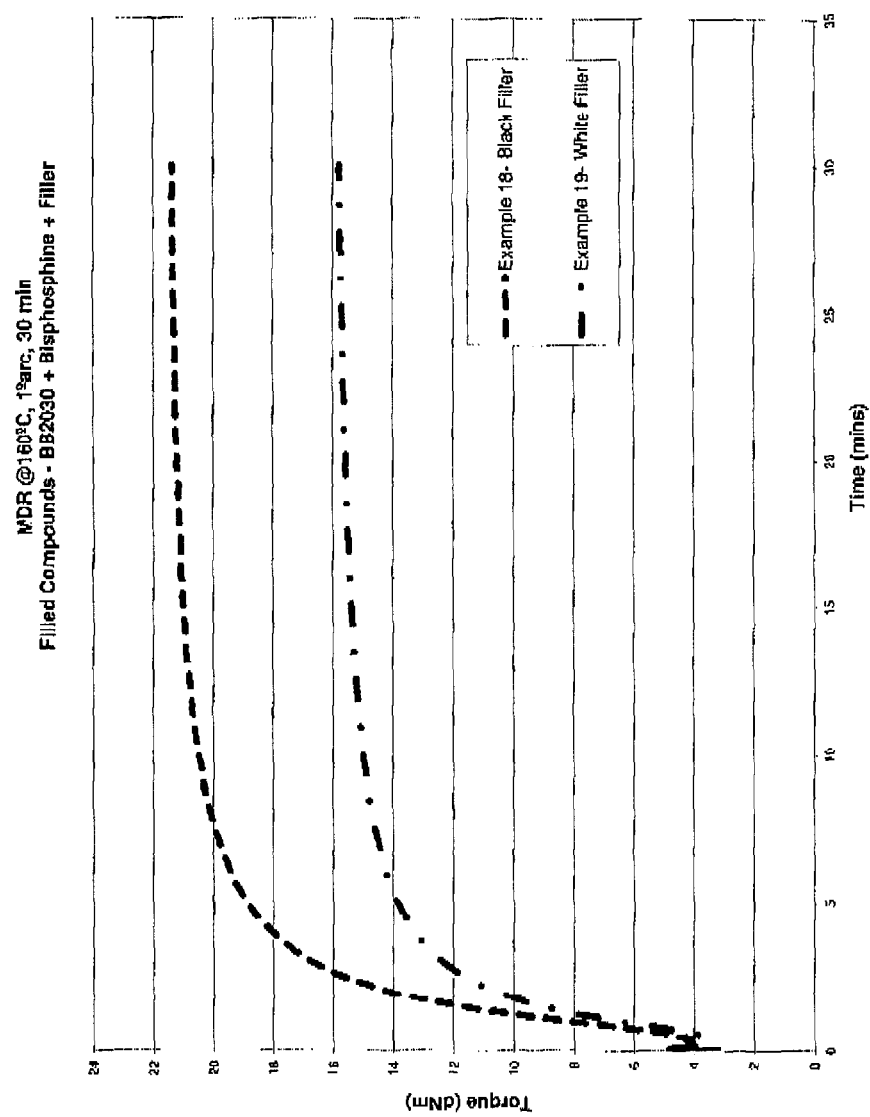
FIG. 6 shows the effects of black and white fillers.

The effects of the filler on the cure behavior of BB2030 are shown in Table 10 and FIG. 6.

TABLE 10

| Example # | Compound | MH (dN · M) | ML (dN · M) | MH − ML (dN · M) |
|---|---|---|---|---|
| 18 | BDPB + carbon black | 21.38 | 3.94 | 17.44 |
| 19 | BDPB + white filler (40 phr) | 15.78 | 3.51 | 12.27 |
| 20 | BDPB + white filler (80 phr) + process aid | 20.81 | 4.48 | 16.33 |
| 21 | Standard Pharma Rubber Closure formulation | 10.8 | 2.7 | 8.1 |

The results show that fillers have no impact on the crosslinking chemistry, and that mechanical strength of the reaction products increased with the presence of fillers.

Bisphosphine Cure in Rubber Closures

Figure 7:
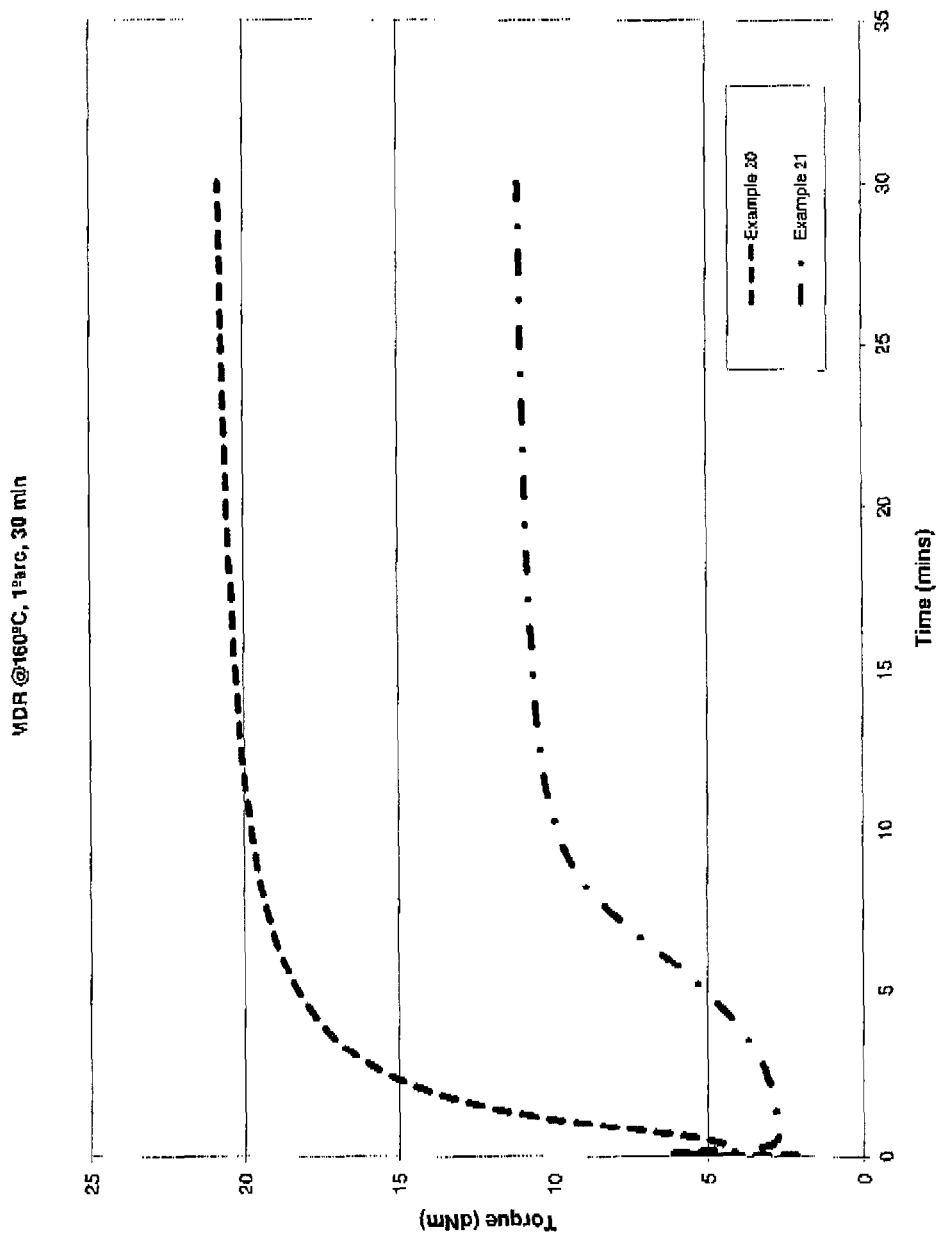
FIG. 7 shows the comparative study of bisphosphine cure versus standard pharmaceutical.

Comparative studies of the properties of cured bisphosphine samples and a typical pharmaceutical rubber closure formulation is shown in Table 11. The results are summarized in Table 12 and shown in FIG. 7.

TABLE 11

| Ingredient (phr) | Example 23 phr | Example 24 phr |
|---|---|---|
| BB2030 | 100 | 100 |
| Calcine clay | 80 | 80 |
| Process aid | 2 | 2 |
| BDPB | 3.4 | |
| Unbrominated phenol formaldehyde resin | | 2 |
| ZnO | | 3 |

TABLE 12

| Example # | Compound | MH (dN.M) | ML (dN.M) | MH-ML (dN.M) | Comp. set (%) | Permeability (cm$^2$/ (atm sec)) |
|---|---|---|---|---|---|---|
| 20 | BDPB + white filler (80 phr) + process aid | 20.81 | 4.48 | 16.33 | 14.8 | 119 |
| 21 | Typical Pharmaceutical Rubber Closure formulation | 10.8 | 2.7 | 8.1 | 24 | 123 |

Compared to typical pharmaceutical rubber closure formulations, the bisphosphine cure system provides fast cure at high cure state with good compression set and good impermeability.

Vulcanizates based on the new cure system shows significant improvement in compression set properties than the conventional resin cure formulation for bromobutyl.

The invention claimed is:

1. A cured, sulfur free and ZnO free compound comprising a halogen containing polymer crosslinked with bis(2-diphenylphosphinophenyl)ether.

2. The compound according to claim 1, wherein the halogen containing polymer is at least one halobutyl polymer selected from bromobutyl polymers, chlorobutyl polymers, and mixtures thereof.

3. The compound according to claim 1, wherein the halogen containing polymer is at least one halogen containing polymer selected from bromine containing polymers, chlorine containing polymers, and mixtures thereof.

4. The compound according to claim 1, wherein the halogen containing polymer is selected from the group consisting of brominated isobutylene para-methylstyrene, brominated isoprene isobutylene p-methylstyrene terpolymer, starbranch brominated butyl, and mixtures thereof.

5. The compound according to claim 1, further comprising at least one filler and at least one process aid.

6. The compound according to claim 5, wherein the filler is selected from the group consisting of carbon black, white fillers, and mixtures thereof.

7. A cured, sulfur free and ZnO free compound comprising:
a halogenated butyl rubber formed from isobutylene and less than 2.2 mol % isoprene;
and
a multifunctional phosphine crosslinking agent of the structure

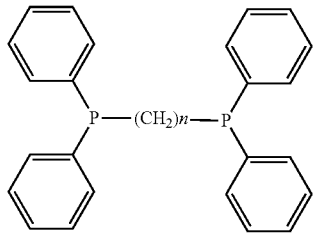

wherein n≥3.

8. The compound according to claim 7, wherein the halogenated butyl polymer is a bromobutyl polymer or a chlorobutyl polymer.

9. The compound according to claim 7, wherein the polymer is selected from the group consisting of brominated isobutyiene para-methylstyrene, brominated isoprene isobutylene p-methylstyrene terpolymer, and star branch brominated butyl.

10. The compound according to claim 7, further comprising a filler and a process aid.

11. The compound according to claim 10, wherein the filler is selected from the group consisting of carbon black, white filler, and mixtures thereof.

12. The compound according to claim 7, wherein the multifunctional phosphine crosslinking agent is selected from the group consisting of 1,3-bis(diphenylphosphino)propane, 1,4-bis(diphenylphosphino)butane, 1,5-bis(diphenylphosphino)pentane, 1,6-bis(diphenyl-phosphino)hexane, and 1,8-bis(diphenylphosphino)octane.

13. The compound according to claim 7, wherein a molar ratio of allylic halide to multifunctional phosphine is 0.01:15 to 15:0.01.

14. The compound according to claim 7, wherein a molar ratio of allylic halide to multifunctional phosphine ratio is 0.01 to 15.

15. The compound according to claim 7, wherein a molar ratio of multifunctional phosphine to allylic halide is 0.01 to 15.

16. A process for preparing a cross-linked rubber compound, the process comprising contacting a halogenated butyl rubber formed from isobutylene and less than 2.2 mol % isoprene, with a multifunctional phosphine crosslinking agent of the structure

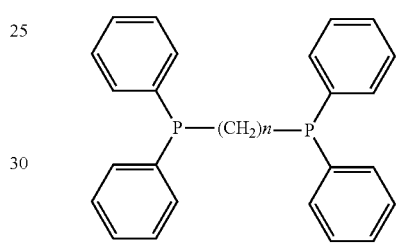

wherein n≥3.

17. The process according to claim 16, wherein the halogenated butyl rubber is a bromobutyl rubber or a chlorobutyl rubber.

18. The process according to claim 16, wherein:
the halogenated butyl rubber is a bromobutyl rubber; and
the contacting comprises reacting the polymer with the multifunctional phosphine crosslinking agent for about 10 to 90 minutes at a temperature of 140 to 200°C.

* * * * *